US007724930B2

(12) United States Patent
Zhou et al.

(10) Patent No.: US 7,724,930 B2
(45) Date of Patent: May 25, 2010

(54) SYSTEMS AND METHODS FOR AUTOMATIC CHANGE QUANTIFICATION FOR MEDICAL DECISION SUPPORT

(75) Inventors: Xiang Zhou, Exton, PA (US); Arun Krishnan, Exton, PA (US); Alok Gupta, Bryn Mawr, PA (US); Vaclav Potesil, Brno (CZ)

(73) Assignee: Siemens Medical Solutions USA, Inc., Malvern, PA (US)

( * ) Notice: Subject to any disclaimer, the term of this patent is extended or adjusted under 35 U.S.C. 154(b) by 876 days.

(21) Appl. No.: 11/590,451

(22) Filed: Oct. 31, 2006

(65) Prior Publication Data

US 2007/0122018 A1 May 31, 2007

Related U.S. Application Data

(60) Provisional application No. 60/832,829, filed on Jul. 24, 2006, provisional application No. 60/733,224, filed on Nov. 3, 2005.

(51) Int. Cl.
 G06K 9/00 (2006.01)
 A61B 6/00 (2006.01)
(52) U.S. Cl. .......................... 382/128; 382/293; 378/21
(58) Field of Classification Search ................. 382/100, 382/128, 129, 130, 131, 132, 133, 134, 168, 382/170, 171, 181, 195, 199, 203, 216, 219, 382/232, 254, 255, 274, 276, 280, 286, 291, 382/293, 305, 312; 378/21; 707/10; 600/425
See application file for complete search history.

(56) References Cited

U.S. PATENT DOCUMENTS

| 6,990,368 | B2 * | 1/2006 | Simon et al. ................. 600/425 |
| 7,187,790 | B2 * | 3/2007 | Sabol et al. ................. 382/128 |
| 7,206,462 | B1 * | 4/2007 | Betke et al. ................. 382/280 |
| 7,418,121 | B2 * | 8/2008 | Kasai ......................... 382/128 |
| 7,490,085 | B2 * | 2/2009 | Walker et al. ................. 707/10 |
| 7,499,578 | B2 * | 3/2009 | Reeves et al. ............... 382/131 |
| 7,522,779 | B2 * | 4/2009 | Fu et al. ..................... 382/254 |
| 7,545,965 | B2 * | 6/2009 | Suzuki et al. ............... 382/128 |

OTHER PUBLICATIONS

Wang et al., "Validation of an Accelerated 'Demons' Algorithm for Deformable Image Registration in Radiation Therapy", Physics in Medicine and Biology, Institute of Physics Publishing, Bristol, GB, vol. 50, No. 12, Jun. 1, 2005, pp. 2887-2905.

Hartkens et al., "Measurement and Analysis of Brain Deformation During Neurosurgery", IEEE Transactions on Medical Imaging, IEEE Service Center, Piscataway, NJ, vol. 22, No. 1. Jan. 2003, pp. 82-92.

* cited by examiner

*Primary Examiner*—Seyed Azarian

(57) ABSTRACT

A method of automatic change quantification for medical decision support includes: automatically detecting a structure in a set of medical images; characterizing the detected structure including modeling of deformation characteristics of the detected structure; matching images based on the characterization of the detected structure, wherein a size measure of the detected structure is constrained according to the deformation characteristics; and quantifying a change in the detected structure.

24 Claims, 6 Drawing Sheets

SYSTEMS AND METHODS FOR AUTOMATIC CHANGE QUANTIFICATION FOR MEDICAL DECISION SUPPORT

CROSS-REFERENCE TO RELATED PATENT APPLICATIONS

This application claims the benefit of U.S. Provisional Application Ser. No. 60/733,224, filed Nov. 3, 2005 and entitled "Systems and Methods for Automatic and Robust Change Quantification for Medical Decision Support," the content of which is herein incorporated by reference in its entirety. This application further claims the benefit of U.S. Provisional Application Ser. No. 60/832,829, filed Jul. 24, 2006 and entitled "Statistical Characterization and Change Quantification Based on Multi-Modal and Multi-Time-Point Medical Images," the content of which is hereby incorporated by reference in its entirety.

BACKGROUND OF THE INVENTION

1. Technical Field

The present disclosure relates to medical imaging and, more particularly, to systems and methods for providing automatic change quantification for medical decision support.

2. Discussion of Related Art

Computer-aided automatic change detection and quantification can be applied for computer-aided medical decision support to enable longitudinal studies of patient data. For example, computer-aided automatic change detection and quantification can be applied to support: computer-aided diagnosis; therapy monitoring of surgical, interventional, radiation, drug therapies; and computer-aided drug development and clinical trials.

Registration is the process of alignment of medical imaging data. FIG. 1 illustrates examples of conventional medical image registration results. Image registration using conventional algorithms may result in a "perfect" registration with no change detection (CD) or a reasonable registration with wrong change detection.

A change detection algorithm typically performs registration first and then performs subtraction or other difference operations. Given that these two tasks are mutually dependent, a sequential solution is not optimal and may produce false results. In fact, the purpose of image registration or image fusion is to discard geometrical changes. So there is a "chicken-and-egg" relationship between registration and change detection. In addition, existing solutions for image registration are highly susceptible to motion and algorithmic artifacts.

SUMMARY OF THE INVENTION

According to an exemplary embodiment of the present invention, a method of automatic change quantification for medical decision support is provided. The method includes: automatically detecting a structure in a set of medical images; characterizing the detected structure including modeling of deformation characteristics of the detected structure; matching images based on the characterization of the detected structure, wherein a size measure of the detected structure is constrained according to the deformation characteristics; and quantifying a change in the detected structure.

According to an exemplary embodiment of the present invention, a system for providing automatic change quantification for medical decision support comprises: a memory device for storing a program; a processor in communication with the memory device, the processor operative with the program to: automatically detect a structure in a set of medical images; characterize the detected structure including modeling of deformation characteristics of the detected structure; match images based on the characterization of the detected structure, wherein a size measure of the detected structure is constrained according to the deformation characteristics; and quantify a change in the detected structure.

According to an exemplary embodiment of the present invention, a method is provided for automatic tumor therapy monitoring. The method includes: automatically segmenting a tumor in a set of medical images using deformation characteristics of the tumor, wherein a size measure of the tumor is constrained according to the deformation characteristics during warping; quantifying a change in a pathological parameter measured from the tumor; and estimating uncertainty in the quantified change in the tumor.

BRIEF DESCRIPTION OF THE DRAWINGS

The present invention will become more apparent to those of ordinary skill in the art when descriptions of exemplary embodiments thereof are read with reference to the accompanying drawings.

DESCRIPTION OF EXEMPLARY EMBODIMENTS

Figure 1:
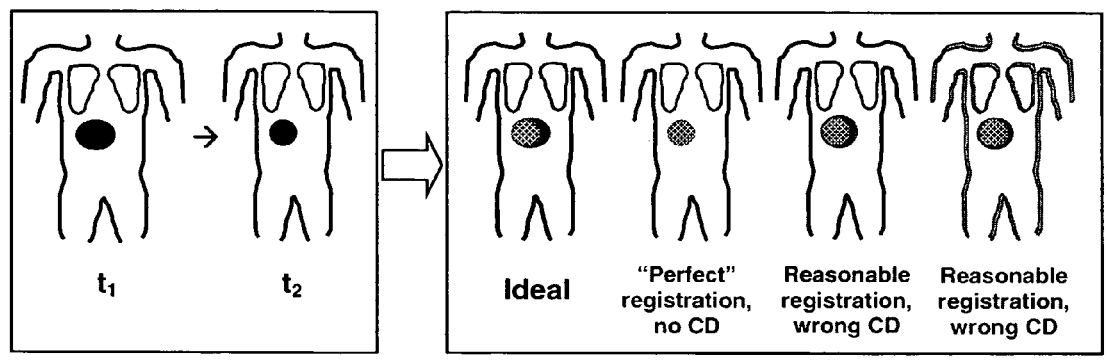
FIG. 1 illustrates examples of conventional medical image registration results.

Hereinafter, exemplary embodiments of the present invention will be described in detail with reference to the accompanying drawings. Like reference numerals refer to similar or identical elements throughout the description of the figures.

Figure 2:
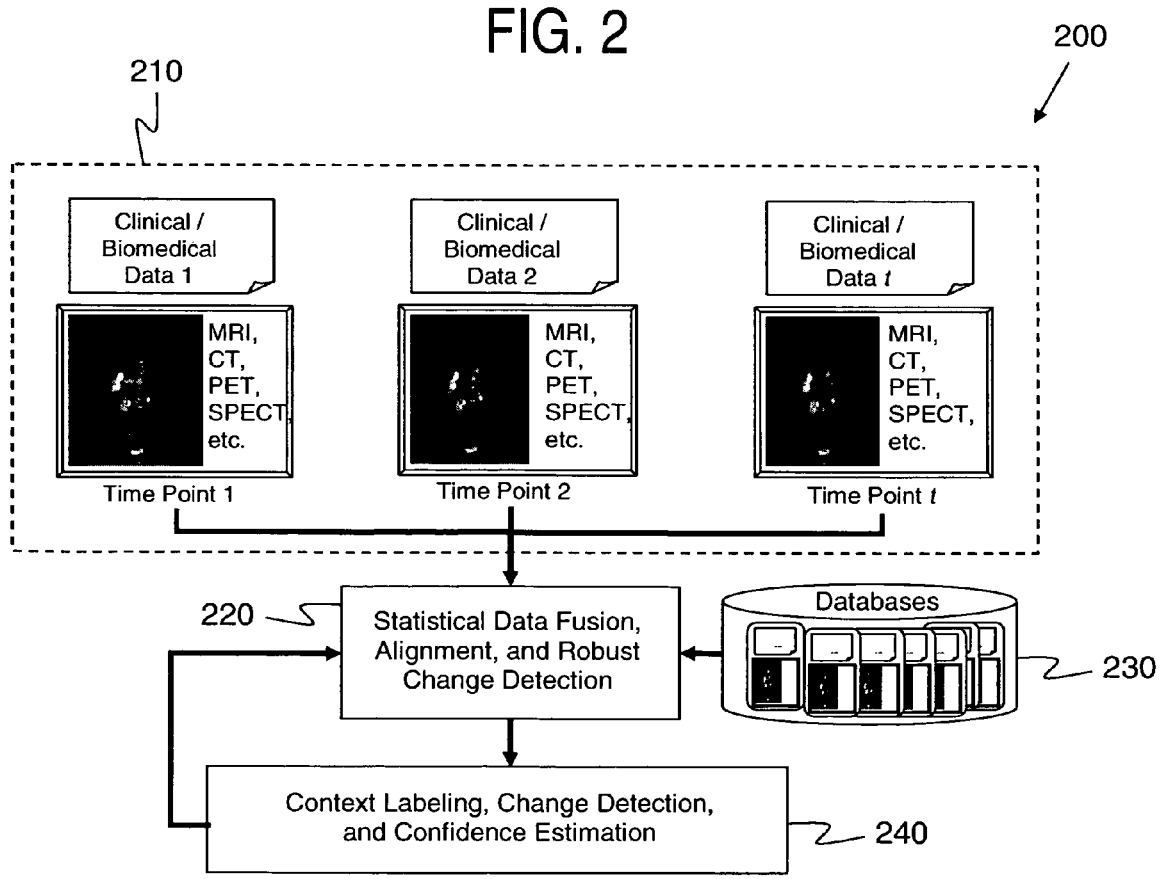
FIG. 2 illustrates system for providing automatic change quantification for medical decision support, according to an exemplary embodiment of the present invention.

FIG. 2 illustrates a system for providing automatic change quantification for medical decision support, according to an exemplary embodiment of the present invention. Referring to FIG. 2, in the system 200 for providing automatic change quantification for medical decision support, the registration step includes uncertainty modeling and context-aware intelligence learned from annotated database.

The system 200 for providing automatic change quantification for medical decision support uses the annotated databases 230 and clinical and/or biomedical data 210 to support statistical data fusion, alignment and robust change detection, as depicted in block 220. The clinical and/or biomedical data may include medical imaging data, such as for example, magnetic resonance imaging (MRI), computed tomography (CT), positron emission tomography (PET), single-photon emission computed tomography (SPECT), X-ray, etc. The clinical and/or biomedical data may include lab data, physician notes, patient history, genetic data, genomic data, and/or proteomics data.

The clinical and/or biomedical data 210 can be collected from two or more time points. For example, as illustrated in FIG. 2, the clinical and/or biomedical data 210 may include the clinical/biomedical data 1 collected at time point 1, clinical/biomedical data 2 collected at time point 2, and clinical/biomedical data t collected at time point t. Changes can be detected among all or a subset of the clinical and/or biomedical data 210.

The system outputs 240 of the system 200 include the detected changes and the labeling of different contexts, such as for example, organs, tissues, tumors or lesions, along with an estimated confidence of the detected changes and the context labels. In an exemplary embodiment of the present invention, one or more databases 230, which may include one or more annotated databases, are used to support the context labeling. Statistical methods for estimating confidence of the system outputs 240 may be used for achieving robustness of the system 200.

Figure 3:
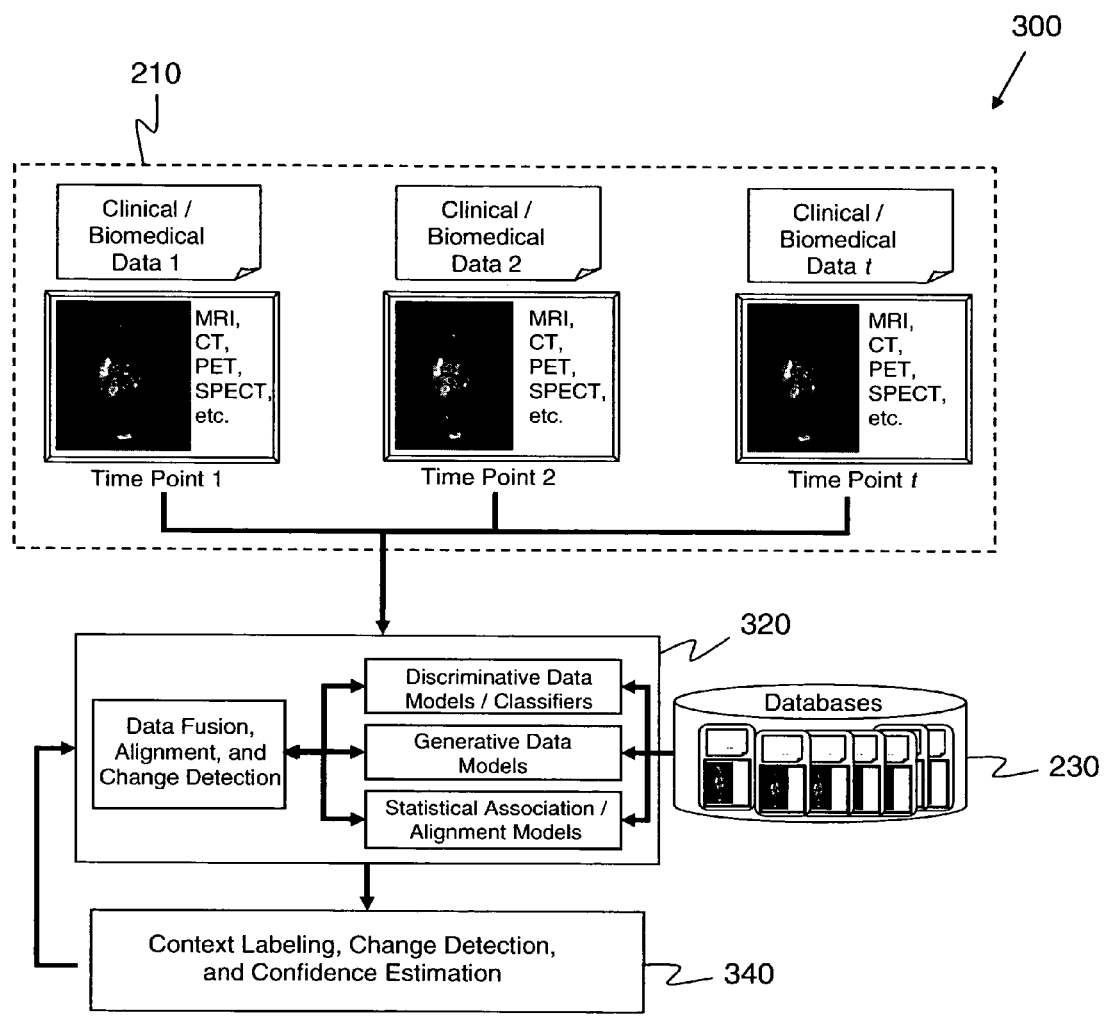
FIG. 3 illustrates a system for providing automatic change quantification for medical decision support, according to an exemplary embodiment of the present invention.

FIG. 3 illustrates a system for providing automatic change quantification for medical decision support, according to an exemplary embodiment of the present invention. The system 300 shown in FIG. 3 is similar to the system 200 for providing automatic change quantification for medical decision support according to the exemplary embodiment of the present invention described in connection with FIG. 2, except for block 320. Further description of the clinical and/or biomedical data 210 and databases 230 is omitted in the clarity and simplicity.

In the system 300 for providing automatic change quantification for medical decision support, one or more annotated databases 230 may be used to train discriminative data models and generative data models, as depicted in block 320. The generative and discriminative data models may include whole-body atlases and boosting-based classifiers, respectively. The generative and discriminative data models may be used for image interpretation.

Whole body atlases may comprise mathematical appearance and/or spatial models of organs or structures in one or multiple whole body imaging modalities. Each model may comprise one or more organs, along with their appearances models and a distributional model to capture their relative locations.

Generative data models may be based on annotated training data. In an exemplary embodiment of the present invention, generative learning and modeling modules can extract statistics, find clusters, and build distributional appearance models or spatial relational models of organs or structures, or spatial or conceptual dependency models for diseases.

Discriminative data models may be based on annotated training data. Discriminative learning and modeling modules, in accordance with an exemplary embodiment of the present invention, can formulate the problem of organ detection/segmentation as a discriminative learning problem, design/select discriminative features, and build two-class or multi-class learning machines, such as classifiers.

In an exemplary embodiment of the present invention, one or more images are input ("image" can also refer to "volume"), and the system 300 performs automatic tumor detection. Optionally, the user can indicate the tumor location manually. Automatic tumor detection may include identifying landmark points inside the image, identifying organ or tissue types and their borders, and using the extracted anatomical or geometrical information to constrain a registration algorithm. For example, landmark points may comprise an upper corner of a left lung, an upper corner of a right lung, a tip of a left kidney or a tip of a right kidney. Automatic landmarking, in accordance with an exemplary embodiment of the present invention, comprises discriminative learning and modeling of local appearance and shape.

In applying statistical analysis, knowledge that changes in certain organs or anatomical regions is more significant than others can be useful. Even changes at the same location may carry different importance for different patients, depending on their clinical history. For example, a change detected near the skin of a patient may not be as important as changes detected inside the vertebra such as in a case where the patient had lung cancer and is undergoing chemotherapy and radiation therapy.

The system 300 for providing automatic change quantification for medical decision support performs statistical analysis on matching uncertainties and outputs parameters characterizing such uncertainties. Examples of the sources of uncertainties include: intrinsic structural uncertainties associated with different image patterns; tissue-dependent uncertainties such as growth or deformation characteristics of tumor versus healthy tissue, growth or deformation characteristics of soft tissue versus bone, etc.; process-induced uncertainties such as the statistical behaviors of hardware/software and selected algorithms; and patient priors based on clinical history and genetic background.

Figure 8:
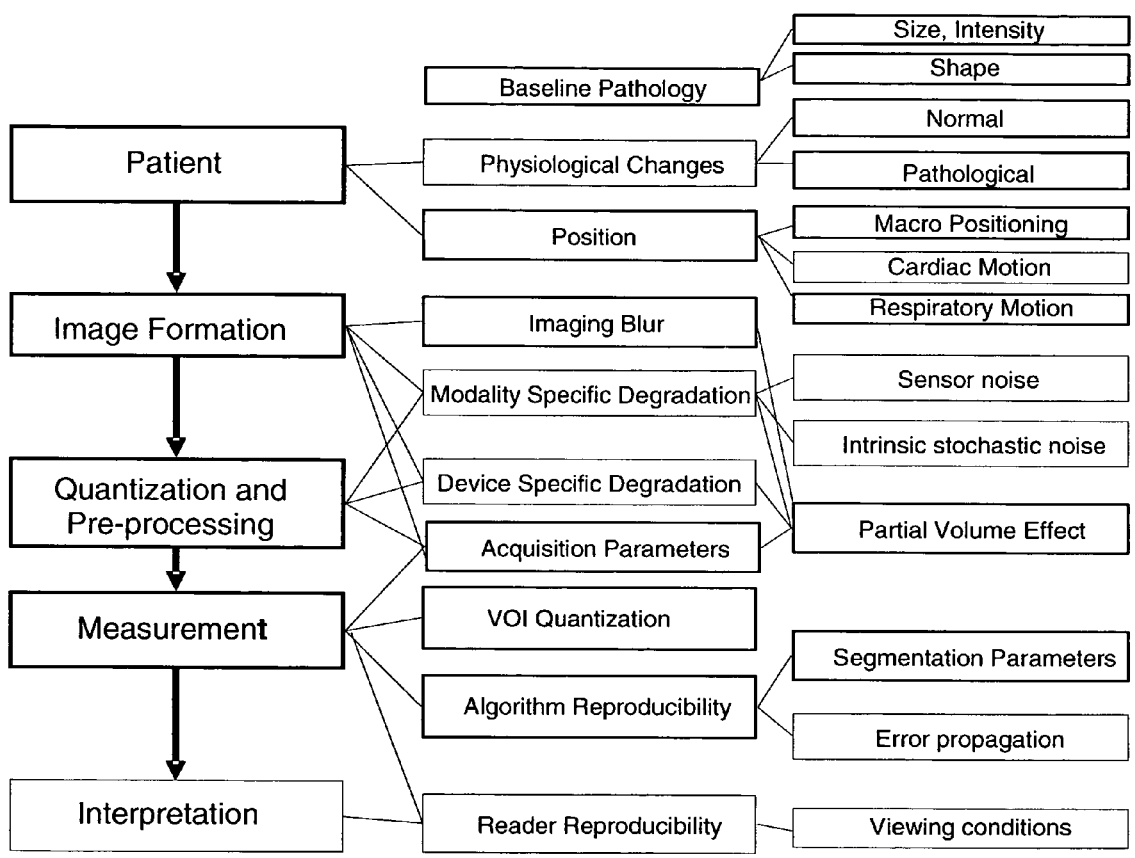
FIG. 8 illustrates examples of the sources of uncertainty in images and volumes.

FIG. 8 illustrates examples of the sources of uncertainty in images and volumes. Referring to FIG. 8, uncertainties associated with image formation, for example, include image blur and modality specific degradation such as sensor noise, intrinsic stochastic noise and partial volume effect. Uncertainties associated with quantization and preprocessing include, for example, modality-specific degradation, device-specific degradation and acquisition parameters such as partial volume effect. Measurement uncertainties include, for example, acquisition parameters, volume-of-interest (VOI) quantization, algorithm reproducibility such as segmentation parameters and error propagation, and reader reproducibility, such as for example, viewing conditions.

The system 300 for providing automatic change quantification for medical decision support, according to the exemplary embodiment described in connection with FIG. 3, may feed back the estimated uncertainties to constrain a registration process. As shown in FIG. 3, the context labeling, change detection and/or confidence estimation 240 may be fed back to the block 320. For example, the system 300 may feed back the estimated uncertainties to constrain a change detection process or a change quantification process.

In an exemplary embodiment of the present invention, the system 300 for providing automatic change quantification for medical decision support uses the estimated uncertainties to compute or output 340 confidence values for matching parameters, organ/tissue/structure labeling, and/or detected changes.

One form of representing uncertainty in images and volumes, according to an exemplary embodiment of the present invention, uses covariance matrices.

Figure 4:
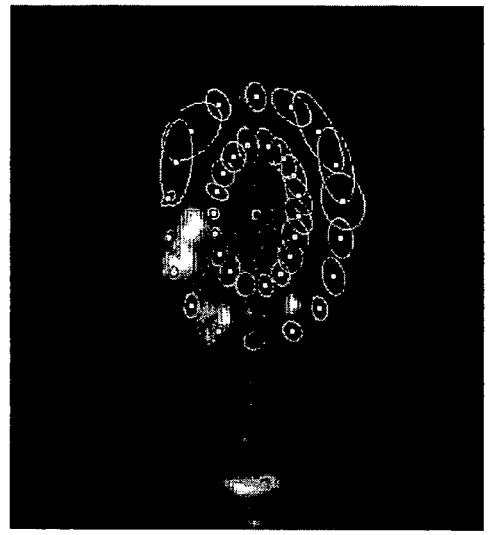
FIG. 4 illustrates an example of representing uncertainty in images and volumes using covariance matrices, according to an exemplary embodiment of the present invention.

FIG. 4 illustrates examples of structural uncertainty in an image using covariance matrices, according to an exemplary embodiment of the present invention. Referring to FIG. 4, the examples of structural uncertainty are depicted as ellipses that represent a 95% confidence interval of such covariance matrices. A confidence interval is an interval within which a true value of a measurement lies with a given probability. Hereinafter, two methods of estimating structural uncertainty will be described.

Assuming conservation of image intensity and Gaussian noise, a least-square-based matching algorithm will have an uncertainty covariance matrix as given by Equations 1 and 2.

$$C = \sigma^2 G^{-1}, \quad (1)$$

$$\text{where } G = \sum_{(x_i', y_j) \in W} \begin{bmatrix} I_x(x_i, y_j)^2 & I_x(x_i, y_j)I_y(x_i, y_j) \\ I_x(x_i, y_j)I_y(x_i, y_j) & I_y(x_i, y_j)^2 \end{bmatrix} \quad (2)$$

In Equation 2, I represents image intensity, and x and y are the coordinates.

Without assuming "conservation of image intensity" or Gaussian noise, one can construct a response distribution RD, and estimate covariance matrix based on the Hessian estimate H on RD, as can be expressed in Equation 3.

$$C = |2\pi(-H^{-1})|^{\frac{1}{d+2}}(-H^{-1}) \quad (3)$$

It is to be understood that the above-described systems and methods are applicable to numerical, textual, or categorical data, as well as images. In an exemplary embodiment of the present invention, uncertainty analysis is applied to data types when an uncertainty value is assigned to each piece of information, regardless of its native form. The uncertainty value can be compared when performing matching or change detection in different information sources.

Figure 5:
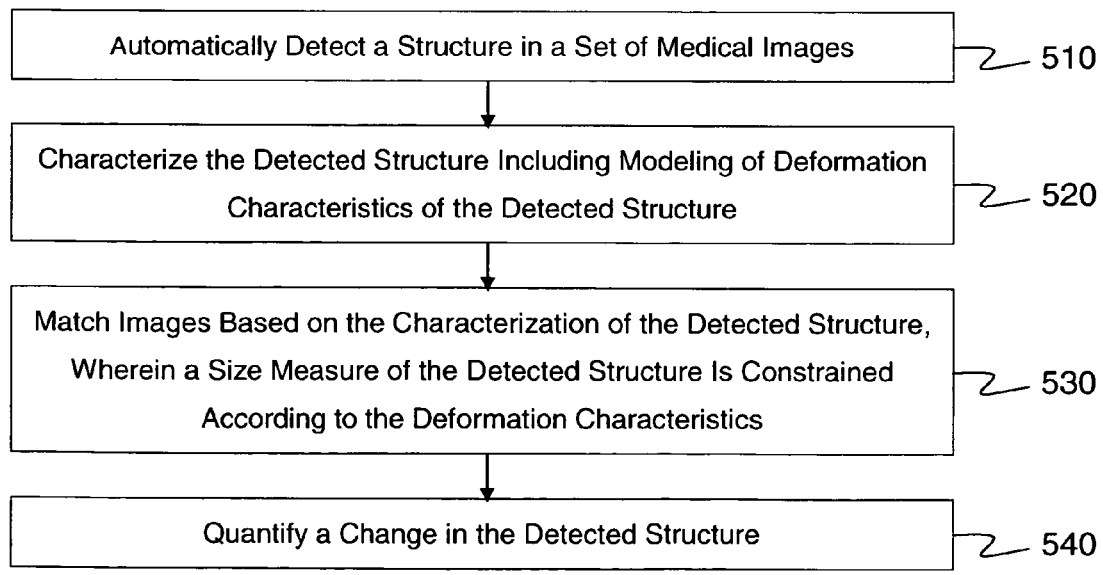
FIG. 5 is a flowchart showing a method of automatic change quantification for medical decision support, according to an exemplary embodiment of the present invention.
Figure 6:
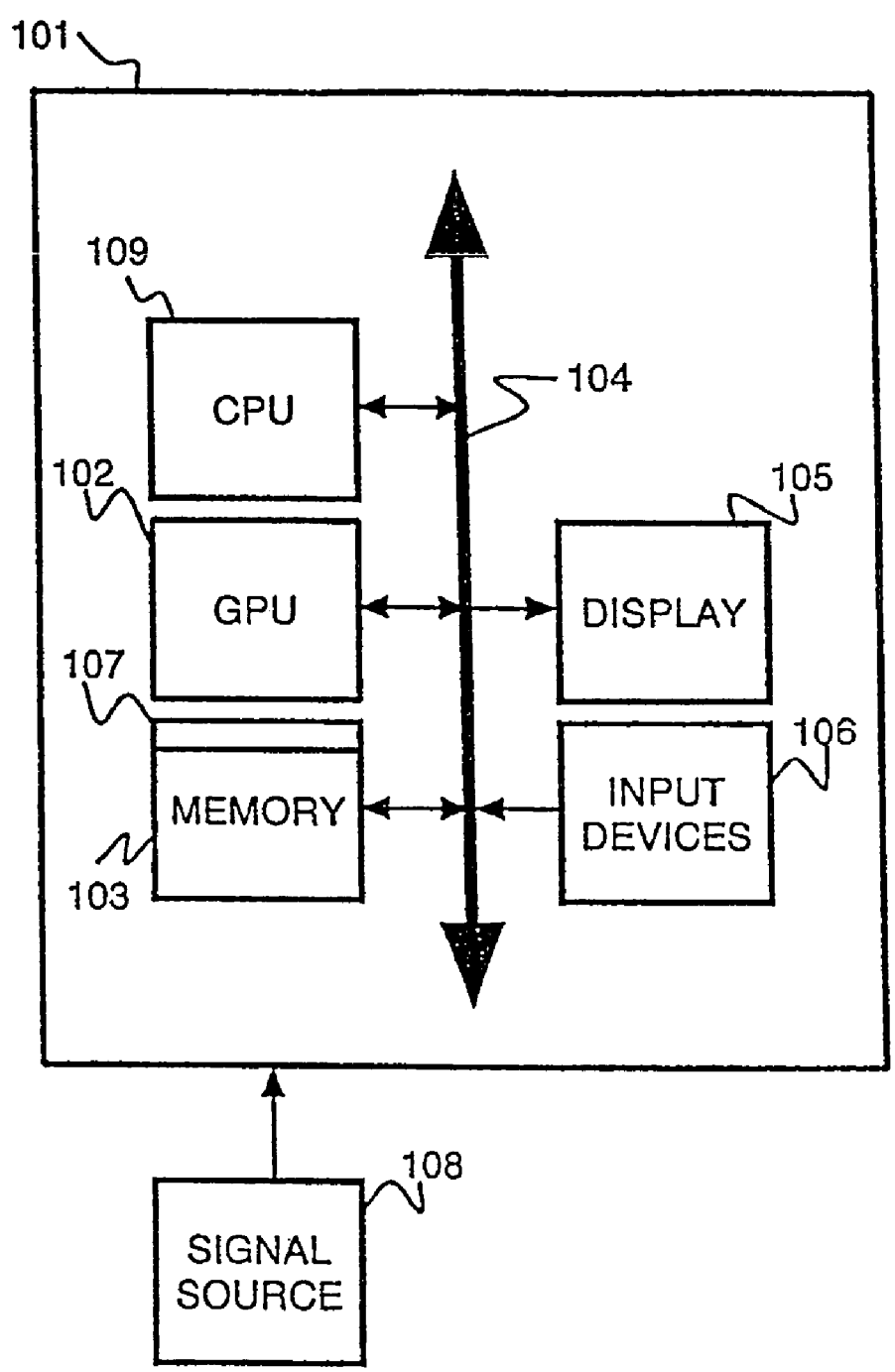
FIG. 6 illustrates a computer system for implementing a method of automatic change quantification for medical decision support, according to an exemplary embodiment of the present invention.

FIG. 5 is a flowchart showing a method of automatic change quantification for medical decision support, according to an exemplary embodiment of the present invention. Referring to FIG. 5, in step 510, automatically detect a structure in a set of medical images. The medical images may comprise two-dimensional medical images, three-dimensional medical images, or higher-dimensional medical images. Detecting the structure in the set of medical images may include, for example, using a segmentation technique, a classification technique and/or a matching technique.

In step 520, characterize the detected structure including modeling of deformation characteristics of the detected structure. For example, characterizing the detected structure may include organ labeling and/or anatomical context labeling. The characterizing step 520 may include geometrical or morphological constraint of organs and/or structures.

In an exemplary embodiment of the present invention, modeling of deformation characteristics of the detected structure includes elasticity modeling of tissues or structures, modeling of soft tissue characteristics and/or modeling of fat deformation characteristics. Modeling of deformation characteristics may include, for example, modeling of rigidity of bone structures and/or articulatory modeling of joints between bones or cartilages. Modeling of deformation characteristics may include modeling of pathological tissue deformation characteristics.

In step 530, match images based on the characterization of the detected structure, wherein a size measure of the detected structure is constrained according to the deformation characteristics. The size measure of the detected structure may be, for example, volume, diameter, radius, projection length, a one-dimensional measure, two-dimensional measure or three-dimensional measure of the detected structure.

For example, matching images based on the characterization of the structure may include the use of the characterization of the structure as constraints in a matching algorithm. Matching images based on the characterization of the structure may include the prediction of correct matching based on the characterization of the structure and/or the use of the characterization of the structure as initial conditions for a matching algorithm. Matching images based on the characterization of the structure may include the use of the characterization of the structure to resolve matching ambiguities.

In step 540, quantify a change in the detected structure. For example, quantifying a change in the detected structure may include quantifying a change in a physiological, pathological or anatomical parameter measured from the detected structure.

A method of automatic change quantification for medical decision support, according to an exemplary embodiment of the present invention, includes estimating uncertainty in the quantified change in the detected structure. Estimating uncertainty in the quantified change in the detected structure may include, for example, estimating a confidence interval of a physiological, pathological or anatomical parameter measured from the detected structure. Estimating uncertainty in the quantified change in the detected structure may include estimating intrinsic structural uncertainties associated with the set of medical images.

Estimating such uncertainty may include estimating tissue-dependent uncertainties. For example, tissue dependent uncertainties may include growth or deformation characteristics of tumor versus healthy tissue. Tissue dependent uncertainties may include growth or deformation characteristics of soft tissue versus bone.

The estimation of uncertainty in the quantified change in the detected structure may include estimating process-induced uncertainties. For example, process-induced uncertainties include statistical behaviors of hardware, software or algorithms.

Estimating uncertainty in the quantified change in the detected structure may be based on patient clinical history or genetic background. The estimated uncertainty in the quantified change in the detected structure may be fed back to constrain the detecting step 520.

In an exemplary embodiment of the present invention, the matching images step 530 includes a registration process, and the estimated uncertainty in the quantified change in the detected structure is fed back to constrain the registration process. The estimated uncertainty in the quantified change in the detected structure may be fed back to constrain quantifying a change in the detected structure, in step 540

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 5, according to an embodiment of the present disclosure, a computer system 101 for implementing a method of automatic change quantification for medical decision support can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

In an exemplary embodiment of the present invention, a system for providing automatic change quantification for medical decision support comprises a memory device 103 for storing a program, and a processor 109 in communication with the memory device 103. The processor 109 is operative with the program to: automatically detect a structure in a set of medical images; characterize the detected structure including modeling of deformation characteristics of the detected structure; match images based on the characterization of the detected structure, wherein a size measure of the detected structure is constrained according to the deformation characteristics; and quantify a change in the detected structure.

The medical images may comprise two-dimensional medical images, three-dimensional medical images, or higher-dimensional medical images. The size measure of the detected structure may be, for example, a volume, diameter, radius, projection length, one-dimensional measure, two-dimensional measure or three-dimensional measure of the detected structure.

When automatically detecting the structure in the set of medical images, the processor 109 may be further operative with the program to perform a segmentation technique, a classification technique or a matching technique.

In an exemplary embodiment of the present invention, when characterizing the detected structure, the processor 109 is further operative with the program to perform organ labeling, anatomical context labeling, or geometrical or morphological constraint of organs and structures.

When modeling deformation characteristics of the detected structure, the processor 109 may be further operative with the program to perform elasticity modeling of tissues or structures, modeling of soft tissue characteristics, modeling of fat deformation characteristics, modeling of rigidity of bone structures, and/or articulatory modeling of joints between bones or cartilages. When modeling deformation characteristics of the detected structure, the processor 109 may be further operative with the program to perform modeling of pathological tissue deformation characteristics.

When matching images based on the characterization of the detected structure, the processor 109 may be further operative with the program to use the characterization of the structure as constraints in a matching algorithm. When matching images based on the characterization of the detected structure, the processor 109 may be further operative with the program to predict correct matching based on the characterization of the structure, or use the characterization of the structure as initial conditions for a matching algorithm. When matching images based on the characterization of the detected structure, the processor 109 may be further operative with the program to use the characterization of the structure to resolve matching ambiguities.

When quantifying a change in the detected structure, the processor 109 may be further operative with the program to quantify a change in a physiological, pathological or anatomical parameter measured from the detected structure.

In an exemplary embodiment of the present invention, the processor 109 is further operative with the program code to estimate uncertainty in the quantified change in the detected structure. When estimating uncertainty in the quantified change in the detected structure, the processor 109 may be further operative with the program to estimate a change of a physiological, pathological or anatomical parameter measured from the detected structure. When estimating uncertainty in the quantified change in the detected structure, the processor 109 may be further operative with the program to estimate intrinsic structural uncertainties associated with the set of medical images.

When estimating uncertainty in the quantified change in the detected structure, the processor 109 may be further operative with the program to estimate tissue dependent uncertainties. Tissue-dependent uncertainties may include, for example, growth or deformation characteristics of tumor versus healthy tissue, or growth or deformation characteristics of soft tissue versus bone, etc.

When estimating uncertainty in the quantified change in the detected structure, the processor 109 may be further operative with the program to estimate process-induced uncertainties. Process-induced uncertainties include, for example, statistical behaviors of hardware, software or algorithms.

The estimated uncertainty may be fed back to constrain the detecting step.

In an exemplary embodiment of the present invention, when matching images based on the characterization of the detected structure, the processor 109 is further operative with the program to perform a registration process, and wherein the estimated uncertainty is fed back to constrain the registration process.

A system for providing automatic change quantification for medical decision support, according to an exemplary embodiment of the present invention, may include a medical images database. The processor 109 may be further operative with the program to apply uncertainty analysis to data extracted from the medical images database. The processor 109 may be further operative with the program to apply uncertainty analysis to clinical data.

Clinical data may comprise numerical, textual and/or categorical data.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 7:
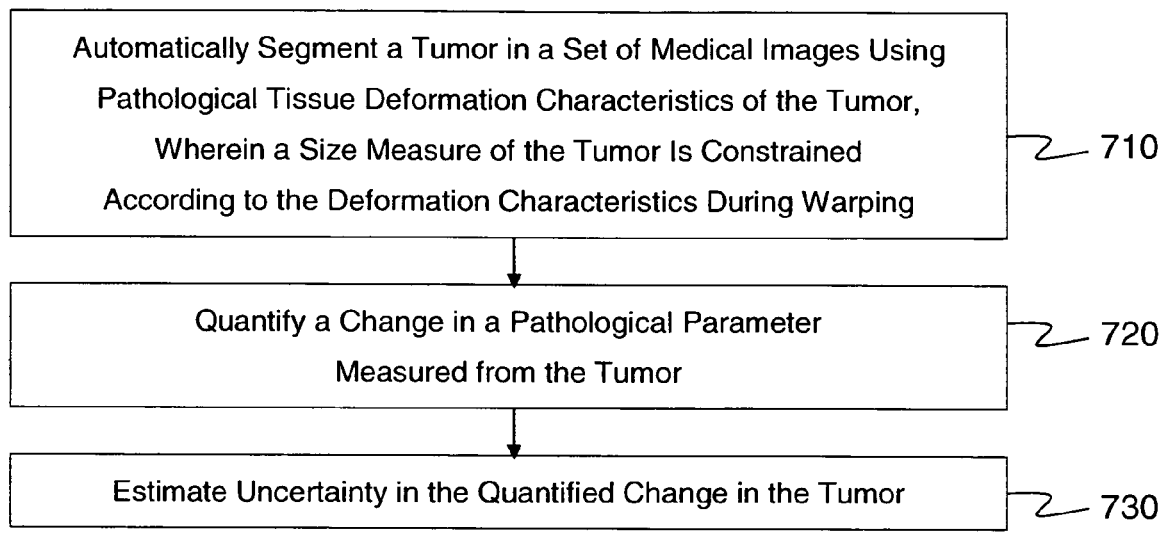
FIG. 7 is a flowchart showing a method of tumor therapy monitoring, according to an exemplary embodiment of the present invention.

FIG. 7 is a flowchart showing a method of tumor therapy monitoring, according to an exemplary embodiment of the present invention. Referring to FIG. 7, in step 710, automatically segment a tumor in a set of medical images using deformation characteristics of the tumor, wherein a size measure of the tumor is constrained according to the deformation characteristics during warping. The medical images may comprise two-dimensional medical images, three-dimensional medical images, or higher-dimensional medical images.

The size measure of the tumor may be, for example, volume, diameter, radius, projection length, a one-dimensional measure, two-dimensional measure or three-dimensional measure of the tumor. Segmenting a tumor may include receiving a user input indicative of a tumor location.

In step 720, quantify a change in a pathological parameter measured from the tumor.

In step 730, estimate uncertainty in the quantified change in the tumor. Estimating uncertainty in the quantified change in the tumor may be based on, for example, patient clinical history or genetic background. The estimated uncertainty may be fed back to constrain the segmenting step.

A method of tumor therapy monitoring, according to an exemplary embodiment of the present invention, includes identifying landmark points inside the set of medical images and/or identifying organ or tissue types and their borders in the set of medical images. Extracted anatomical or geometrical information may be used to constrain a registration process.

A method of tumor therapy monitoring according to an exemplary embodiment of the present invention includes modeling of deformation characteristics of the tumor.

Although exemplary embodiments of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments can be made without departing from the scope of the invention as defined by the appended claims, with equivalents of the claims to be included therein.

What is claimed is:

1. A method of automatic change quantification for medical decision support, comprising:
   automatically detecting a structure in a set of medical images;
   characterizing the detected structure including modeling of deformation characteristics of the detected structure;
   matching images based on the characterization of the detected structure, wherein a size measure of the detected structure is constrained according to the deformation characteristics; and
   quantifying a change in the detected structure;
   wherein estimating a uncertainty in the quantified change in the detected structure comprises estimating a confidence interval of a physiological, pathological or anatomical parameter measured from the detected structure.

2. The method of claim 1, wherein modeling of deformation characteristics of the detected structure comprises at least one of elasticity modeling of tissues or structures, modeling of soft tissue characteristics, modeling of fat deformation characteristics, modeling of rigidity of bone structures, or articulatory modeling of joints between bones or cartilages.

3. The method of claim 1, wherein modeling of deformation characteristics of the detected structure comprises modeling of pathological tissue deformation characteristics.

4. The method of claim 1, wherein the size measure of the detected structure comprises a volume, a diameter, a radius, a projection length, a one-dimensional measure, two-dimensional measure or three-dimensional measure of the detected structure.

5. The method of claim 1, wherein quantifying a change in the detected structure comprises quantifying a change in a physiological, pathological or anatomical parameter measured from the detected structure.

6. The method of claim 1, further comprising estimating uncertainty in the quantified change in the detected structure.

7. The method of claim 6, wherein estimating uncertainty in the quantified change in the detected structure comprises at least one of estimating process-induced uncertainties or estimating intrinsic structural uncertainties associated with the set of medical images.

8. The method of claim 6, wherein estimating uncertainty in the quantified change in the detected structure comprises estimating tissue-dependent uncertainties.

9. The method of claim 6, wherein the estimated uncertainty is fed back to constrain the detecting step.

10. The method of claim 6, wherein the step of matching images includes a registration process, and wherein the estimated uncertainty is fed back to constrain the registration process.

11. The method of claim 6, wherein the estimated uncertainty is fed back to constrain the step of quantifying a change in the detected structure.

12. A system for providing automatic change quantification for medical decision support, comprising:
    a memory device for storing a program;
    a processor in communication with the memory device, the processor operative with the program to:
    automatically detect a structure in a set of medical images;
    characterize the detected structure including modeling of deformation characteristics of the detected structure;
    match images based on the characterization of the detected structure, wherein a size measure of the detected structure is constrained according to the deformation characteristics; and
    quantify a change in the detected structure;
    wherein when estimating uncertainty in the quantified change in the detected structure, the processor is further operative with the program to estimate a change of a physiological, pathological or anatomical parameter measured from the detected structure.

13. The system of claim 12, wherein when modeling deformation characteristics of the detected structure, the processor is further operative with the program to perform at least one of elasticity modeling of tissues or structures, modeling of soft tissue characteristics, modeling of fat deformation characteristics, modeling of rigidity of bone structures, or articulatory modeling of joints between bones or cartilages.

14. The system of claim 12, wherein when modeling deformation characteristics of the detected structure, the processor is further operative with the program to perform modeling of deformation characteristics.

15. The system of claim 12, wherein when matching images based on the characterization of the detected structure, the processor is further operative with the program to use the characterization of the structure to resolve matching ambiguities.

16. The system of claim 12, wherein when quantifying a change in the detected structure, the processor is further operative with the program to quantify a change in a physiological, pathological or anatomical parameter measured from the detected structure.

17. The system of claim 12, further comprising estimating uncertainty in the quantified change in the detected structure.

18. The system of claim 17, wherein when estimating uncertainty in the quantified change in the detected structure, the processor is further operative with the program to estimate at least one of process-induced uncertainties or intrinsic structural uncertainties associated with the set of medical images.

19. The system of claim 17, wherein when estimating uncertainty in the quantified change in the detected structure, the processor is further operative with the program to estimate tissue-dependent uncertainties.

20. The system of claim 17, wherein the estimated uncertainty is fed back to constrain the detecting step.

21. The system of claim 17, wherein when matching images based on the characterization of the detected structure, the processor is further operative with the program to perform a registration process, and wherein the estimated uncertainty is fed back to constrain the registration process.

22. A method of automatic tumor therapy monitoring, comprising:

automatically segmenting a tumor in a set of medical images using deformation characteristics of the tumor, wherein a size measure of the tumor is constrained according to the deformation characteristics during warping;

quantifying a change in a pathological parameter measured from the tumor;

and estimating uncertainty in the quantified change in the tumor;

wherein the estimated uncertainty is fed back to constrain the segmenting step.

23. The method of claim 22, wherein estimating uncertainty in the quantified change in the tumor is based on patient clinical history or genetic background.

24. The method of claim 22, further comprising modeling of deformation characteristics of the tumor.

* * * * *